Nov. 18, 1969  N. P. MICHELS  3,478,657
CAMERA WITH DATING APPARATUS
Filed June 16, 1966
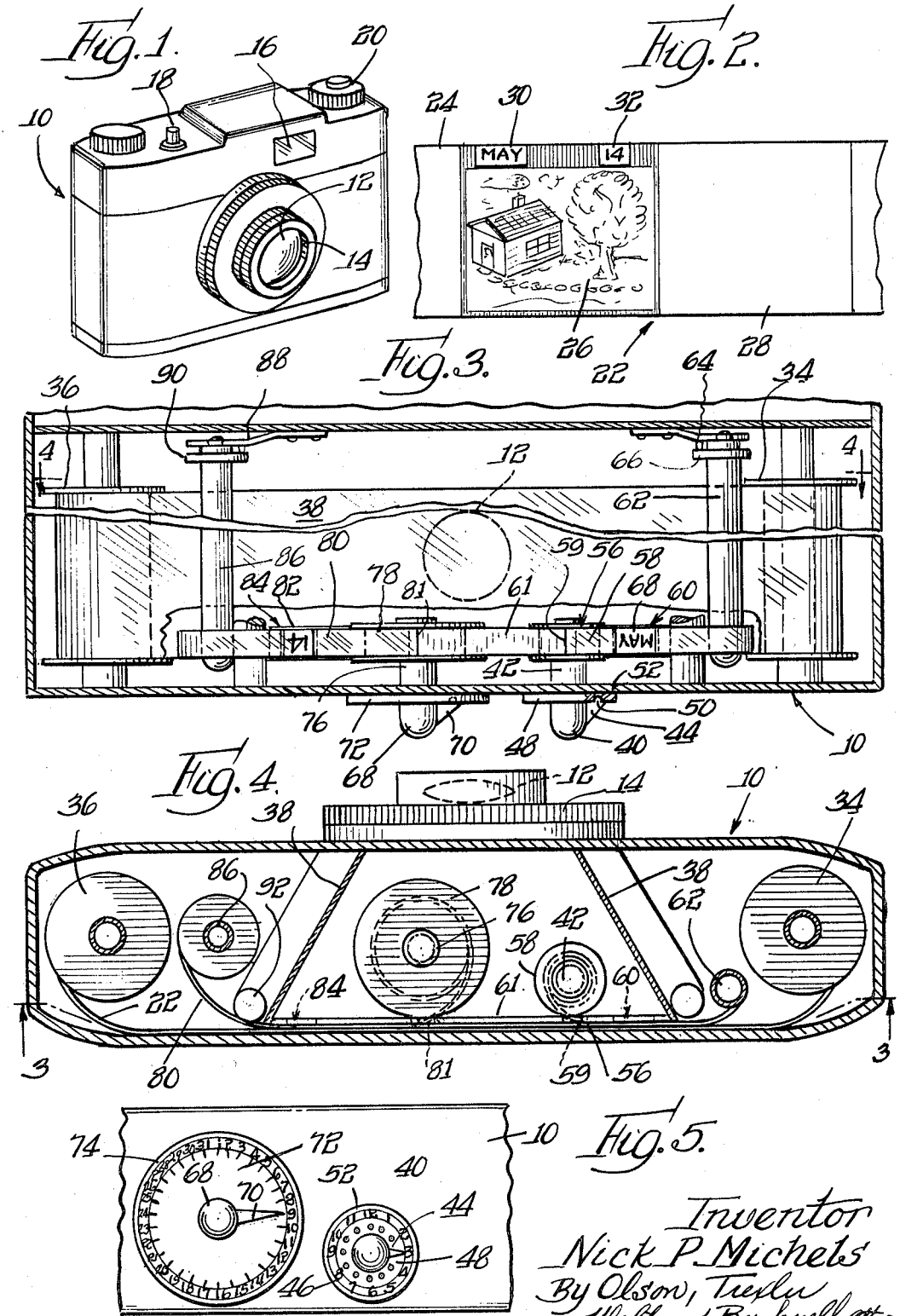
Inventor
Nick P. Michels
By Olson, Trexler
Wolters & Bushnell attys.

United States Patent Office 3,478,657
Patented Nov. 18, 1969

3,478,657
CAMERA WITH DATING APPARATUS
Nick P. Michels, 439 St. Mary's Parkway,
Buffalo Grove, Ill. 60090
Filed June 16, 1966, Ser. No. 557,982
Int. Cl. G03b 17/24
U.S. Cl. 95—1.1          4 Claims

ABSTRACT OF THE DISCLOSURE

In a camera a tape bearing indicia is arranged in front of the film and at one edge thereof, so that scene light passing to the film will be intercepted by the indicia bearing tape, and the indicia will be printed upon the film. The tape is supported to be moved between two spools so that the indicia can be changed as desired.

This invention relates to the photographic arts, and more particularly to a device for automatically dating negatives or transparencies as the exposure is made in a camera.

Except for professional photographers and a limited number of ardent amateur photographers, it is fairly common for camera owners to take a few pictures in one day, and then not finish the roll of film in the camera for weeks, or months thereafter. Often, by the time the film is removed from the camera, the photographer has quite forgotten when he took the pictures. Although processors often apply the month and year date, this may be completely inadequate when pictures on the same roll have been taken months apart, and certainly does not give a true indication of the day date.

Accordingly, it is an object of this invention to provide an improved feature on a photographic camera for automatically applying the date to the film at the time the exposure is made.

It is a further object of the present invention to provide a dating device in a camera which is relatively inexpensive and can be incorporated in a camera without unduly increasing the cost thereof.

A further object of the present invention is to use a small portion of the light coming through the lens during the taking of a picture to record photographically the date on the film.

It is further an object of the present invention to provide a photographic camera having transparent tapes with date indicia thereof which wind up on opposite sides of the picture taking area and have portions thereof disposed in front of the picture taking area for intercepting light passing to the film photographically to impress the image thereof on the film.

Other and further objects and advantages of the present invention will be apparent from the following description when taken in connection with accompanying drawings wherein:

FIG. 1 is a perspective view of a camera of otherwise ordinary construction incorporating the principles of the present invention;

FIG. 2 is a view of the film;

FIG. 3 is a rear view in partial vertical section showing the dating mechanism;

FIG. 4 is a horizontal sectional view through the camera as taken substantially along the line 4—4 in FIG. 3; and FIG. 5 is a fragmentary bottom view of the camera showing the outer date setting dials thereon.

With reference to the drawings as hereinafter set forth in greater detail, it will be understood that the camera may be substantially conventional in every way, except for the addition of the dating apparatus. Therefore, certain parts thereof are shown in somewhat stylized fashion. In FIG. 1 there will be seen a camera designated generally by the numeral 10, having a lens 12 and shutter 14. The camera is provided with a viewfinder 16, a shutter release 18, and a film winding knob 20. The camera illustrated is of the simple snap-shot type using paper backed roll film, and for this type of camera only a single take-up knob is used. However, it will be understood that perforated roll film could be used in the usual 35 mm. cartridges, or in the more recent "Instamatic" format and cartridge. The invention also is useful with "Polaroid" cameras or movie cameras.

Turning to FIG. 2, there will be seen a film 22. Assuming that the film has been exposed and processed, but has not yet been cut apart, it will be seen that the film will have the usual separate frames, negatives, or transparencies, such as at 24, 26 and 28. A scene is roughly depicted on the transparency or negative 26, and it will be seen that along the top edge thereof the month date is photographically imprinted at 30, while the day date is photographically imprinted at 32. Preferably this is not quite at the margin of the film to allow space for mounting color transparencies as slides without masking out the date. The manner in which the date is so produced is seen in FIGS. 3 and 4.

The usual film supply spool 34 is mounted within one end of the camera body, the right end in FIGS. 3 and 4. Correspondingly, a take-up spool 36 is mounted at the opposite end, being selectively advanced by the winding knob 20. The film 22 extends between the spools, and is wound on both of them, as it moves from one to the other, extending along the back inner surface of the camera. Light baffles 38 determine the lateral limits of the picture taking area, in accordance with conventional practice. The structure up to this point may be quite conventional in nature, and the disclosure and description therefore are kept at a relatively rudimentary level.

The distinguishing features of the camera incorporating the principles of my invention are set forth hereinafter, and include a knob 40 on the underside of the camera body 10 (see also FIG. 5) for rotating a shaft 42 extending within the camera body. The knob 40 is provided with a pointer 44 cooperating with indicia 46 representing the months of the year on a dial 48 fixed to the underside of the camera body concentric with the knob. The pointer 44 is provided on its underside with a protuberance 52 selectively received in an annular row of recesses 52. It will be obvious that the dial 48 could be an integral, coplanar part of the underside of the camera body. The recesses 52 correspond to the various indicia 46 for snapping the knob 40 from one detent position to another. Conveniently both the knob (including the pointer) and the dial are formed of plastic material having some inherent resiliency, whereby this detent action may be obtained without the necessity of spring loading the parts.

Within the camera, and overlapping the normal bottom portion of the picture taking area (corresponding to the top of the picture due to the inversion of the subject matter by the lens), there is a spool or reel 56 having a transparent tape 58 wound thereon. This tape extends, through a slot 59 in a plate 61 past the date printing area or window 60 in plate 61 and is wound up on a spool 62 mounted for rotataton in the camera, as by means of a bearing structure on a bracket 64 secured within the top portion of the camera body, generally adjacent to the supply spool 34. A spiral spring 66 loads the spool 62 so as to place a tension on the tape 58, tending to unroll the tape from the spool or reel 56. Hence, when the knob 40 is turned in a clockwise direction, as viewed from the bottom of the camera, the tape 58 will unreel or unwind from the spool or reel 56, and will wind up on the spool 62. The tape is provided with successive month indicia, such as illustrated at 68, successively aligned with the month date exposing area 60. As will be seen in FIGS. 3 and 4 this area is exposed to light passing through the lens 12, and otherwise forming a part of the normal picture taking light.

As will be appreciated, the width of the month date exposing area 60 is correlated to the width of the indicia on the tape, and the diameter of the take-up spool or reel 56 is correlated to this and to the arcuate degree of movement of the knob 40 from one step to another to position each month date in sequence in the date marking area 60.

A similar knob 68 having a pointer 70 is provided in cooperation with a dial 72 on the bottom of the camera and to the left of the knob 40. The dial 72 in most instances will be of greater diameter than the dial 48, due to the necessity of accommodating indicia 74 corresponding to the maximum possible 31 days in a month. The knob has a detent arrangement with the dial, as in the month dating mechanism, and is connected to a shaft 76 bearing a take-up reel or spool 78 having a transparent tape 80 capable of winding up thereon. The tape 78 is provided with numbered indicia 82 from 1 through 31, for exposure at a day dating window 84 in plate 61. The tape 80 extends from the spool 78 through a slot 81 in plate 61 and winds up on a spool 86 mounted on a bracket 88, the spool being spring biased by a spiral spring 90 fixed to the spool at one end and to the bracket 88 at the other end.

As will be appreciated, the knob 68 is turned from one detent position to another to bring the correct day date 84 into position in the exposing area 82, the pointer 70 indicating the same number on the dial 72. Typically, the tape 80 will be of greater length than the tape 58, whereby the spool or reel 78 is of greater diameter than the spool or reel 56. A greater thickness or number of turns of tape will wind up on the spool 86 than on the spool 62, and therefore greater clearance is provided about the spool 86. The tape 80 generally passes over a guide 92 to pass between the spool 86 and spool or reel 78, whereas this generally is not necessary with regard to the tape 58.

Placing of the spring loaded spools 62 and 86 at opposite ends of the picture taking area, and disposition of the take-up spools or reels immediately at the bottom edge of the picture taking area with control knobs extending directly therefrom through the bottom of the camera provide for simplicity of construction, while keeping the added parts out of the way. Furthermore, with the knobs 68 and 40 laid out in side-by-side relationship, they are conveniently readable, yet do not interfere with the operation of one another. Use of light already passing through the lens 12 avoids the necessity of providing an auxiliary lens, and of modifying the interior of the camera body to a large extent to prevent passage of any supplemental light onto the main picture taking area of the film since such extraneous light would cause degradation of the image.

It will be seen that a desirable feature has been added to a camera at low cost, whereby each picture is automatically dated, thus providing an everlasting record as to when the picture was taken. The tapes 58 and 78 have been mentioned as being transparent, but could be translucent, pellucid being used as a generic term. Alternatively, the tapes could be opaque with pellucid indicia thereon.

The particular example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. In a photographic camera having a body, a picture taking lens, a shutter, means in said body defining an area for forming a photographic impression on film, and means including film supply and film advancing means for selectively transporting film across said area, the combination comprising shiftable means mounted entirely within said body and having date indicia thereon, one of said shiftable means and said indicia being pellucid relative to the other, means for supporting said shiftable means between said picture taking lens and said area for intercepting a portion of the light passed by said lens to superimpose said indicia photographically on film at said area, and means for adjusting the position of said shiftable means to position indicia corresponding to the date a picture is taken in light intercepting position, said shiftable means comprising an elongated tape, a pair of spool means on which said tape is wound, extending from one spool means to another across said light intercepting position, one spool means being located within said area and the other spool means being located exteriorly of said area but within the body and adjacent one said film supply or advancing means, spring means acting on one of said spool means and tending resiliently to wind the tape thereon, adjusting means extending exteriorly of said camera body for turning the other of said spool means, and detent means on said adjusting means for resisting the force of said spring means.

2. The combination as set forth in claim 1 wherein said shiftable means comprises a pair of tapes, and two spool means for each tape, each tape extending between its two spool means across light intercepting position, there being two light intercepting positions spaced from one another in the direction of film travel, said adjusting means being connected to at least one of each two spool means and extending exteriorly of said camera body.

3. The combination as set forth in claim 2 wherein the adjusting means comprises a pair of knobs positioned in side-by-side relation.

4. In a photographic camera having a substantially light tight body, means for selectively admitting light to said body including a picture taking lens and a shutter, means in said body defining a picture taking area for forming a photographic impression on film, and means including film supply and advancing means for selectively transporting film across said area, the combination comprising a pair of tapes respectively having date indicia thereon, one of each tape and indicia being pellucid relative to the other, two pairs of spool means within said body, each tape being wound on a pair of said spool means and extending therebetween, corresponding spool means of different tapes lying on opposite sides of said picture taking area with one spool means of each pair disposed interiorly thereof and with the other spool means of each pair disposed exteriorly thereof but within the body with one adjacent the film supply means and the other adjacent the film advancing means being spaced in the direction of film travel, said spool means positioning said tapes respectively in front of said picture taking area for intercepting light selectively admitted to said camera body as an incident to the taking of a picture to superimpose said indicia photographically on film at said picture taking area, and means for turning at least one of each pair of spool means and including means extending exteriorly of said camera body to position indicia corresponding to the date a picture is taken in light intercepting position.

References Cited

UNITED STATES PATENTS

| | | | |
|---|---|---|---|
| 813,808 | 2/1906 | Loryea | 95—1.1 |
| 1,359,245 | 11/1920 | Gaisman | 95—1.1 |
| 1,481,272 | 1/1924 | Robertson | 95—1.1 |
| 2,226,364 | 12/1940 | Anthony | 95—1.1 |

JOHN M. HORAN, Primary Examiner